US009360921B2

(12) United States Patent
Kayama

(10) Patent No.: US 9,360,921 B2
(45) Date of Patent: Jun. 7, 2016

(54) SEMICONDUCTOR INTEGRATED CIRCUIT, INFORMATION PROCESSING APPARATUS, AND CONTROL METHOD

(71) Applicant: CANON KABUSHIKI KAISHA, Tokyo (JP)

(72) Inventor: Kazuya Kayama, Chofu (JP)

(73) Assignee: Canon Kabushiki Kaisha, Tokyo (JP)

(*) Notice: Subject to any disclaimer, the term of this patent is extended or adjusted under 35 U.S.C. 154(b) by 249 days.

(21) Appl. No.: 13/841,464

(22) Filed: Mar. 15, 2013

(65) Prior Publication Data

US 2013/0262895 A1    Oct. 3, 2013

(30) Foreign Application Priority Data

Mar. 29, 2012  (JP) ................................. 2012-076774

(51) Int. Cl.
*G06F 1/32*  (2006.01)

(52) U.S. Cl.
CPC ............... *G06F 1/324* (2013.01); *G06F 1/329* (2013.01); *G06F 1/3237* (2013.01); *G06F 1/3287* (2013.01); *Y02B 60/1221* (2013.01); *Y02B 60/1282* (2013.01); *Y02B 60/144* (2013.01)

(58) Field of Classification Search
CPC ......... G06F 1/24; G06F 1/324; G06F 1/3237; G06F 1/3287; G06F 1/329; G06F 1/26; G06F 9/4403; G06F 9/4405; G06F 9/4418; Y02B 60/1221; Y02B 60/1282; Y02B 60/144
See application file for complete search history.

(56) References Cited

U.S. PATENT DOCUMENTS

| 4,245,150 | A | 1/1981 | Driscoll |
| 5,664,089 | A | 9/1997 | Byers |
| 6,586,969 | B1* | 7/2003 | Koe .................................. 326/93 |
| 2002/0149353 | A1 | 10/2002 | Inaba |
| 2010/0097101 | A1* | 4/2010 | Chua-Eoan et al. ............ 326/82 |
| 2011/0241741 | A1* | 10/2011 | Millendorf et al. ............ 327/143 |
| 2014/0025966 | A1* | 1/2014 | Iwami et al. ................... 713/300 |

FOREIGN PATENT DOCUMENTS

| CN | 1565079 A | 1/2005 |
| JP | 2002-312073 A | 10/2002 |
| JP | 2006-331107 A | 12/2006 |
| JP | 2009-054031 A | 3/2009 |

* cited by examiner

*Primary Examiner* — Dennis M Butler
(74) *Attorney, Agent, or Firm* — Canon U.S.A., Inc. IP Division

(57) ABSTRACT

In a system large-scale integration (LSI) including a plurality of subsystems having a power shutdown mechanism, sometimes instantaneous power consumption of the LSI intensively increases at timing of supplying a clock for initialization due to a shift of a power mode of a subsystem. After power supply starts to return to a first subsystem and a second subsystem, an increase in power consumption during initialization is distributed by desynchronizing timing of clock supply to start initialization for the first subsystem and the second subsystem.

22 Claims, 12 Drawing Sheets

FIG. 6

| SUBSYSTEM | POWER CONSUMPTION VALUE DURING CLOCK SUPPLY STATE [mW] |
|---|---|
| 1 | 150 |
| 2 | 250 |
| 3 | 200 |
| 4 | 300 |
| 5 | 220 |
| 6 | 130 |
| 7 | 160 |
| 8 | 300 |
| 9 | 220 |
| 10 | 130 |
| 11 | 160 |
| 12 | 250 |
| 13 | 150 |
| 14 | 200 |
| 15 | 100 |
| 16 | 220 |
| 17 | 160 |
| 18 | 350 |
| 19 | 200 |

FIG. 10

| POWER MODE | \ | 1 | 2 | 3 | 4 | 5 | 6 | 7 | 8 | 9 | 10 | 11 | 12 | 13 | 14 | 15 | 16 | 17 | 18 | 19 | POWER CONSUMPTION PROFILING VALUE | TEMPERATURE PROFILING |
|---|---|---|---|---|---|---|---|---|---|---|---|---|---|---|---|---|---|---|---|---|---|---|
| | 0 | ON | ON | ON | ON | ON | ON | ON | ON | ON | ON | ON | ON | ON | ON | ON | ON | ON | ON | ON | 3.0 W | 85°C |
| | 1 | OFF | OFF | OFF | ON | OFF | OFF | OFF | OFF | OFF | OFF | OFF | OFF | OFF | OFF | OFF | OFF | OFF | OFF | OFF | 0.2 W | 50°C |
| | 2 | ON | OFF | OFF | ON | OFF | OFF | OFF | OFF | OFF | OFF | OFF | OFF | OFF | OFF | OFF | OFF | OFF | OFF | OFF | 0.5 W | 60°C |
| | 3 | OFF | OFF | OFF | OFF | OFF | OFF | OFF | OFF | OFF | OFF | OFF | OFF | OFF | OFF | OFF | OFF | OFF | OFF | OFF | 0.1 W | 40°C |
| | 4 | ON | ON | OFF | ON | ON | ON | ON | ON | ON | ON | OFF | ON | ON | ON | ON | ON | ON | OFF | ON | 1.3 W | 70°C |
| | 5 | ON | ON | OFF | ON | ON | ON | ON | ON | ON | OFF | ON | OFF | ON | ON | ON | ON | ON | ON | ON | 0.3 W | 45°C |
| | 6 | ON | ON | OFF | ON | ON | ON | ON | ON | ON | ON | OFF | OFF | ON | ON | ON | OFF | ON | ON | ON | 1.1 W | 65°C |
| | 7 | ON | ON | OFF | ON | ON | ON | ON | ON | ON | ON | ON | OFF | ON | ON | ON | ON | ON | ON | ON | 0.9 W | 62°C |
| | 8 | ON | ON | ON | ON | ON | ON | ON | ON | ON | ON | ON | ON | ON | ON | ON | ON | ON | OFF | ON | 2.3 W | 75°C |
| | 9 | ON | ON | ON | ON | ON | OFF | OFF | ON | ON | ON | ON | ON | ON | ON | ON | ON | ON | ON | OFF | 2.1 W | 72°C |
| | 10 | ON | ON | ON | ON | ON | OFF | OFF | ON | ON | ON | ON | ON | ON | ON | ON | ON | ON | OFF | OFF | 2.0 W | 70°C |

ON/OFF STATE OF POWER SOURCE OF EACH SUBSYSTEM

SEMICONDUCTOR INTEGRATED CIRCUIT, INFORMATION PROCESSING APPARATUS, AND CONTROL METHOD

BACKGROUND OF THE INVENTION

1. Field of the Invention

The present invention relates to a semiconductor integrated circuit, and relates to a reset cancel operation at the time of a return from power shutdown.

2. Description of the Related Art

In recent years, the trend of energy saving in consideration of environmental issues has been leading to a growing demand for a reduction in power consumption to semiconductor integrated circuits. For example, to reduce power consumption, there is a method of shutting down power to a part of subsystems in a semiconductor integrated circuit.

At the time of returning power to a subsystem for which power has been shut down, initialization is required after power is supplied, and the initialization is performed before starting a normal operation. During the initialization, the state of the subsystem is initialized by actively causing a signal change to a storage element such as a flip-flop within the subsystem. Therefore, during the initialization, high power consumption is often required due to poor execution of clock gating. For solving this problem, Japanese Patent Application Laid-Open No. 2002-312073 discusses a technique for reducing power consumption by dividing a frequency of a clock input during initialization to reduce a performance.

In recent semiconductor devices, the number of regions for which power is shut down (this region is generally referred to as a "power control target" or a "power domain", and will hereinafter be referred to as a "power domain") is increasing. Arranging a plurality of subsystems for realizing functions in different power domains allows power to be shut down to a power domain where a subsystem for realizing an unnecessary function is arranged, thereby enabling a reduction in power consumption.

Each power domain requires an initialization operation (especially, a start of clock supply for placing a flip-flop into an initial state and cancel of a reset signal) after a restart of power supply. Further, commonly-used semiconductor integrated circuits synchronize initialization (the timing of issuing a clock and a reset signal and the timing of cancelling the signals) to reduce a possibility of error occurrence, when resetting a plurality of internal subsystems. However, an overlap of clock supply operations for initialization for the plurality of power domains results in concentration of and an increase in instantaneous power consumption during the initialization. The technique discussed in Japanese Patent Application Laid-Open No. 2002-312073 can reduce a peak of power consumption to some degrees, but cannot solve concentration of an increase in instantaneous power consumption.

SUMMARY OF THE INVENTION

According to an aspect of the present invention, a semiconductor integrated circuit includes a power control unit configured to control power supply to a plurality of power domains, and an initialization control unit configured to individually control initialization for each of the plurality of power domains. After the power control unit starts the power supply to a first power domain and a second power domain, the initialization control unit operates in such a manner that a start of clock supply for the initialization for the second power domain is delayed from a start of clock supply for the initialization for the first power domain.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a table of (estimated) power consumption values for each subsystem when a clock is returned.

FIG. 10 is a table of a power state of each subsystem, a power consumption estimation, and a temperature estimation, for each power mode of each subsystem.

DESCRIPTION OF THE EMBODIMENTS

Various exemplary embodiments, features, and aspects of the invention will be described in detail below with reference to the drawings.

Figure 1:
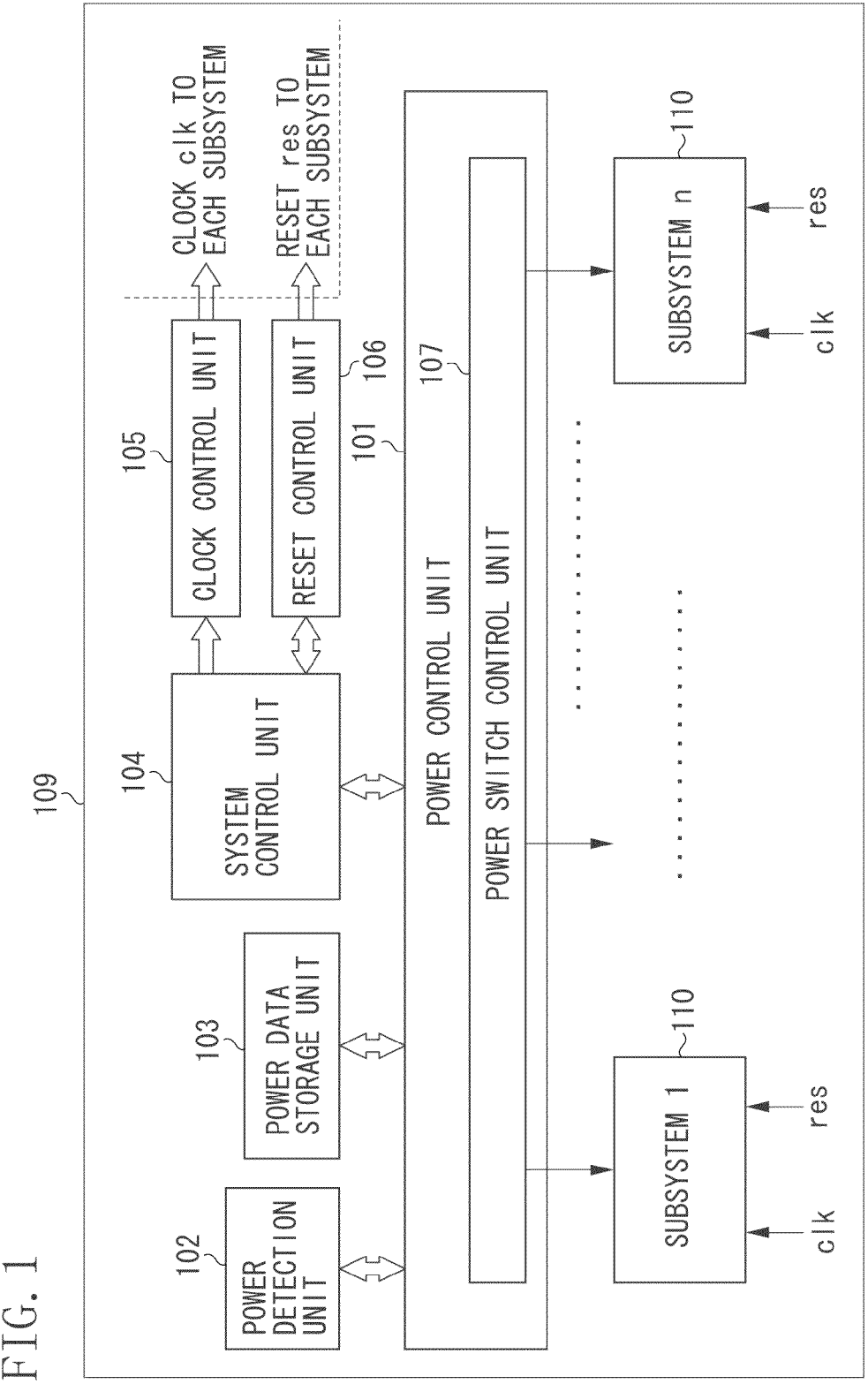
FIG. 1 is a block diagram of a configuration of an exemplary embodiment of the present invention.

First, a semiconductor integrated circuit 109 according to a first exemplary embodiment of the present invention will be described. FIG. 1 illustrates an internal configuration of the semiconductor integrated circuit 109.

The semiconductor integrated circuit 109 includes n subsystems. Each subsystem is configured to operate according to a supplied clock to be realized by a functional module (not illustrated) including a built-in function assigned in advance. While a reset signal is supplied, resetting a storage element such as an internal flip-flop continues (asserting an active reset signal continues).

A power control unit 101 switches whether to supply, by a power switch control unit 107, power from a power source for each subsystem that is a power control target unit 110. A power detection unit 102 detects an operation state, such as a temperature, a voltage, and a current, of the semiconductor integrated circuit 109. A power data storage unit 103 has a value as a table, the value indicating power to be consumed during initialization when power supply starts for each subsystem as the power control target unit 110. Further, the power data storage unit 103 holds a predetermined power value, related to power consumption, which serves as a reference for allowing the semiconductor integrated circuit 109 to operate stably.

A system control unit 104 controls a clock control unit 105, a reset control unit (a reset signal control unit) 106, and the power control unit 101, and performs control to distribute clock return timing for reset cancel for a plurality of subsystems (the details of which will be described below). Further, the system control unit 104 controls the entire system, i.e., for example, shifts a power mode of the semiconductor integrated circuit 109 and controls a data processing mode of each subsystem. The clock control unit 105 controls whether to supply a clock individually for each of the plurality of subsystems based on an instruction from the system control unit 104. The reset control unit 106 performs control such as maintaining an initialization operation by continuing to issue a reset signal to each subsystem 110 and ending an initialization operation of an individual subsystem 110 by stopping an issued reset signal, based on an instruction from the system control unit 104. In other words, the reset control unit 106 and the clock control unit 105 function as an initialization control unit for realizing initialization of each subsystem 110 based on an instruction from the system control unit 104.

Each of the power control unit 101 and the system control unit 104 may be a microcomputer, a microprocessor, or a sequencer (such as a programmable logic controller (PLC)) including a Field Programmable Gate Array (FPGA), or may be a combination of logic circuits capable of state control. In this case, the power control unit 101 and the system control unit 104 are configured so as to read out a program (or a parameter), which can realize at least processing algorithms and functions of the power control unit 101 and the system control unit 104 of respective exemplary embodiments that will be described below, from a built-in memory (not illustrated) or the like, and execute the program.

In the example illustrated in FIG. 1, the number of subsystems is n. However, the present invention can be applied to any semiconductor integrated circuit having a plurality of power control targets, and the number of subsystems may be any number. Further, for simplification of the description, the present exemplary embodiment will be described based on an example in which a subsystem and a power domain (such as a power control target) correspond to each other in a one-to-one relationship. However, a subsystem and a power domain do not necessarily have to correspond to each other in a one-to-one relationship. For example, two or more subsystems may correspond to one power domain, or one subsystem may be managed by two or more power domains. The power domain means a region for which power supply can be stopped by the same e power control element (for example, a power switch), and a region defined to reduce a current leakage on a chip. The power domain may be, for example, a circuit block, a functional module, or an integrated circuit (IC) that satisfies this definition.

Figure 2:
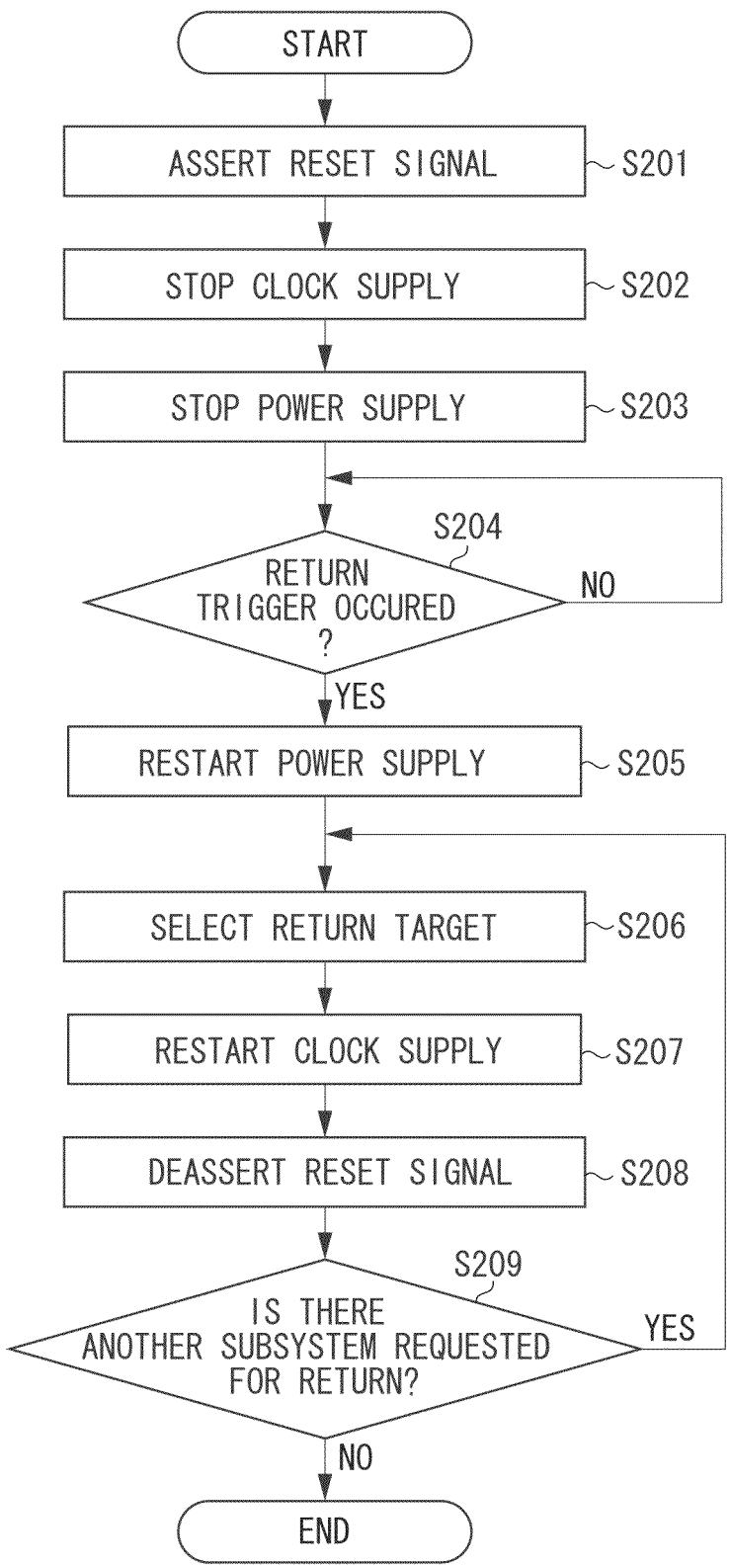
FIG. 2 is a flowchart of processing according to an exemplary embodiment of the present invention.
Figure 3:
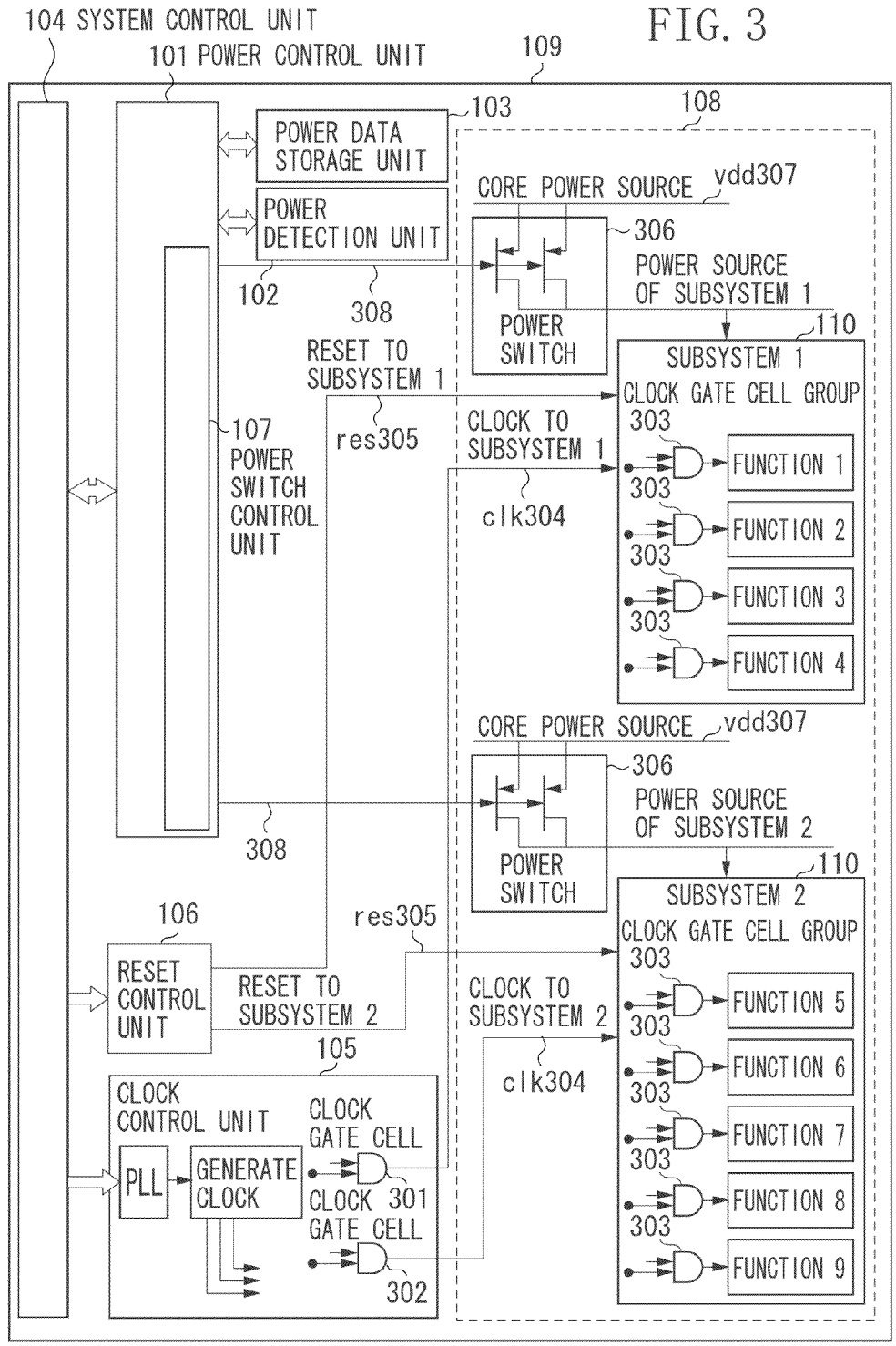
FIG. 3 is a block diagram of a configuration of a semiconductor integrated circuit.

Next, basic operations (a power shutdown operation and a power return operation) of the first exemplary embodiment will be described with reference to FIGS. 2 and 3, based on an operation example in which the power switch control unit 107 shuts down power to two subsystems, a subsystem 1 (a first power domain) and a subsystem 2 (a second power domain), and later returns power. The example illustrated in FIGS. 2 and 3 corresponds to a case where the number of subsystems n=2. FIG. 2 is a flowchart relating to a power shutdown operation and a power return operation in the semiconductor integrated circuit 109. FIG. 3 illustrates the details of the configuration of the semiconductor integrated circuit 109 including the two subsystems.

First, referring to FIG. 2, in step S201, the system control unit 104 commands the reset control unit 106 to activate a reset (res 305) to each of the subsystems 1 and 2 in response to an instruction to shut down power to the subsystems 1 and 2. Then, in response to the command from the system control unit 104, the reset control unit 106 asserts the reset (this will be described as a low-active reset signal in a timing chart that will be described below) to each of the subsystems 1 and 2.

Next, in step S202, the system control unit 104 commands the clock control unit 105 to stop supply of a clock (clk 304) to each of the subsystems 1 and 2. Then, in response to the command from the system control unit 104, the clock control unit 105 stops the supply of the clocks to the subsystems 1 and 2 by activating clock gate cells 301 and 302 (setting control pins to "enable").

Next, in step 203, the system control unit 104 transmits a command that requests shutdown of power supply to the subsystems 1 and 2 (hereinafter referred to as a "shutdown request"), to the power control unit 101. After receiving the shutdown request from the system control unit 104, the power control unit 101 shuts down power by issuing instructions (switch-off) 308 to stop the supply to the power switches 306, which determine power supply to the subsystems 1 and 2, by the power switch control unit 107.

In step S204, the system control unit 104 determines whether a trigger for returning the subsystems 1 and 2 has occurred. Examples of the trigger for returning the subsystems 1 and 2 include an event that the semiconductor integrated circuit 109 receives a request for use of the functional modules (the functions 1 to 9 illustrated in FIG. 3) of the subsystems 1 and 2 from, for example, a user or an application program. In Step S204, self-transition is performed until the trigger occurs. If the system control unit 104 determines in step S204 that the trigger has occurred (YES in step S204), the processing proceeds to step S205.

In step S205, the system control unit 104 causes power supply to the subsystems 1 and 2, which should be returned, to be restarted. More specifically, the system control unit 104 transmits a command that requests a return of power supply to the subsystems 1 and 2 (hereinafter referred to as a "return request") to the power control unit 101. After receiving the power return request command from the system control unit 104, the power control unit 101 controls the power switches of the subsystems 1 and 2 to be set to ON by the power switch control unit 107 to supply power. After completion of charging the subsystems 1 and 2 with electric charges, the processing proceeds to step S206.

In step S206, the power control unit 101 selects at least one subsystem from a plurality of subsystems that are return targets (initialization targets) as a clock return target, and notifies the system control unit 104 of this selection (the details of the method for selecting a clock return target by the power control unit 101 will be described below). The following description will be provided, assuming that the power control unit 101 first selects the subsystem 1 so as to return the clock to the subsystem 1, and notifies the system control unit 104 that the subsystem 1 is in such a state that clock supply can be restarted (issues a clock return instruction). The power control unit 101 may select a subsystem to return randomly. Alternatively, the power control unit 101 may be configured in such a manner that priority information indicating which subsystem should be prioritized is held in a register (not illustrated) in advance, and the power control unit 101 selects a subsystem to return based on the priority information. After receiving the notification, the system control unit 104 instructs the clock control unit 105 and the reset control unit 106 to start an operation for initializing the subsystem 1.

In step S207, after receiving the instruction to start initialization, the clock control unit 105 deactivates gating of the clock gate cell 301 (sets the control pin to "disable"), thereby restarting supply of the clock (clk 304) to the subsystem 1. Further, for a plurality of clock gate cells 303 included in the subsystem 1, the clock control unit 105 also sets the respective control pins to "disable" to initialize the inside of the subsystem 1. Until the reset to the subsystem 1 is canceled, the control pins of the clock gate cells 301 and 303 are maintained in the "disable" state. In other words, the clock control unit 105 continues supplying the clock to the subsystem 1 at least from reception of the command to start initialization (an initialization command) until cancellation of the reset.

The clock control unit 105 continues supplying the clock to the target for a predetermined time after receiving the initialization command from the system control unit 104, and in step S208, the reset control unit 106 cancels the reset to the subsystem 1 (deasserts the reset). At the time of measuring an elapsed time for canceling the reset, a down counter including a decrementer or the like may be used. For example, a predetermined value is set in advance according to, for example, the circuit scale of the subsystem 1. This value is decremented (−1) for each cycle time, and the reset is canceled when the value reaches 0. After the reset is canceled, the subsystem 1 starts a steady operation. The clock control unit 105 may stop supplying the clock when the reset is deasserted, or may stop supplying the clock when a predetermined time has elapsed.

In step S209, the system control unit 104 determines whether there is a subsystem for which a return has been requested but has not yet been returned. For example, the system control unit 104 holds the number m of subsystems for which a return has been requested in a register (not illustrated), and reduces the number of returned subsystems therefrom. Then, the system control unit 104 determines there is a remaining subsystem that has not been returned yet if the number m does not reach 0. At this time, since the subsystem 2 has not yet been returned, steps S206 to S208 are performed for the subsystem 2. If the system control unit 104 determines in step S209 that the subsystems 1 and 2 have been returned (NO in step S209), the processing is ended. Suppose that the system control unit 104 includes n flag registers (not illustrated) that indicate which subsystem is started up. For example, if a k-th stage of the flag register holds "1", this means that a subsystem k is in a startup state. If the k-th stage of the flag register holds "0", this means that the subsystem k is in a power saving state, in which case the power supply is shut down.

In this way, while power is supplied to both the subsystems 1 and 2 at the same time, clock supply start timing for initialization is desynchronized for the subsystems 1 and 2 by the system control unit 104. Therefore, it is possible to prevent power consumption from being concentrated.

Figure 4:
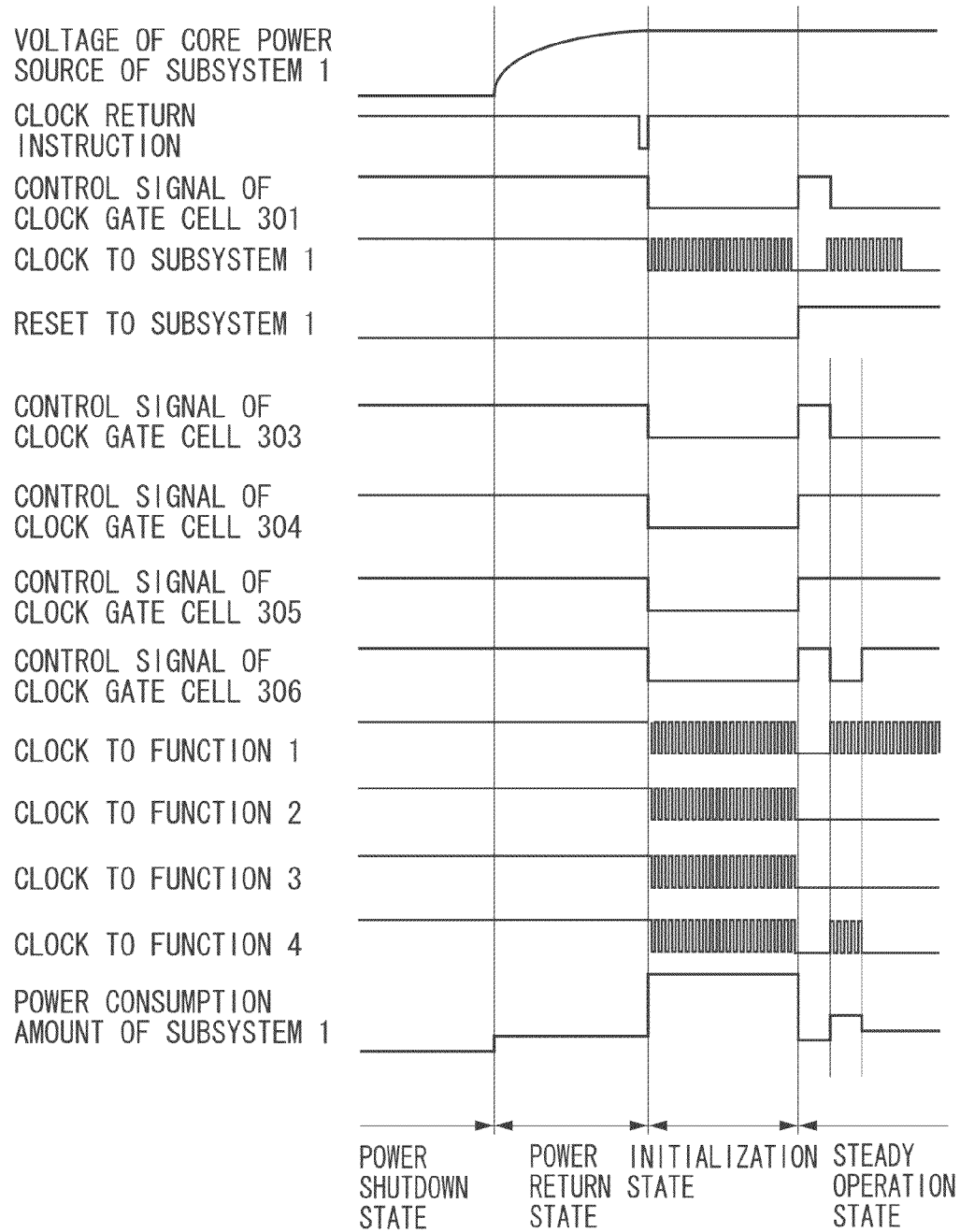
FIG. 4 is an example timing chart when power is returned for a subsystem.

Next, transitions of various kinds of signals and voltages when power is returned for the subsystem 1 will be described with reference to a timing chart of FIG. 4. FIG. 4 is a timing chart when power is returned for the subsystem 1. In FIG. 4, logic signals are illustrated as low-active (negative logic) signals. A control signal to the clock gate cell 303 is set to "disable" (supply a clock) when the voltage is low.

A power shutdown state in FIG. 4 indicates a state such that the power control unit 101 stops power supply to the subsystem 1 (an OFF state), and corresponds to steps S203 and S204 in FIG. 2. A power return state indicates a state in which the power control unit 101 receives the return request from the system control unit 104 until the power control unit 101 transmits the clock return instruction to the system control unit 104, and corresponds to step S206 in FIG. 2. An initialization state indicates a state in which the system control unit 104 issues the initialization command to the clock control unit 105 and the reset control unit 106 until the reset to the subsystem 1 is canceled, and corresponds to steps S207 and S208 in FIG. 2. A steady operation state indicates a state such that the subsystem 1 completes the initialization, and can normally operate without requiring initialization only if the clock is supplied. After the steady operation state starts, the subsystem 1 is placed in a standby state for a predetermined time, and clock supply to each functional module in the subsystem 1 is stopped temporarily by operating the clock gate cell 301.

The lowermost portion of FIG. 4 indicates a transition of a power consumption amount of the subsystem 1. The power consumption in the initialization state is higher than the other states. This is because, in the initialization state, all clock gate cells are set into the "disable" state, and the clock continues being supplied to the functions 1 to 4 and the subsystem 1. The timing chart of the subsystem 2 is similar to the timing chart of subsystem 1, and therefore the detailed description thereof is omitted herein.

In this way, it is possible to prevent power consumption from being concentrated by desynchronizing clock supply start timing for initialization for a plurality of power control targets (for example, subsystems).

Next, a description will be given of a method by which the power control unit 101 selects a clock return target according to a second exemplary embodiment. When the timing of a clock supply start for initialization is desynchronized for a plurality of power control targets, the present exemplary embodiment groups together clock supply start timing for a range where there is no problem (for example, power consumption does not exceed rated power or predetermined power) even if their respective clock supply start timing overlap. As a result, it is possible to achieve balanced trade-off between the speed of initialization and distribution of power consumption. In the following description, features and processes similar to those of the first exemplary embodiment described above will be indicated by the same reference numerals, and descriptions thereof will be omitted.

Figure 5:
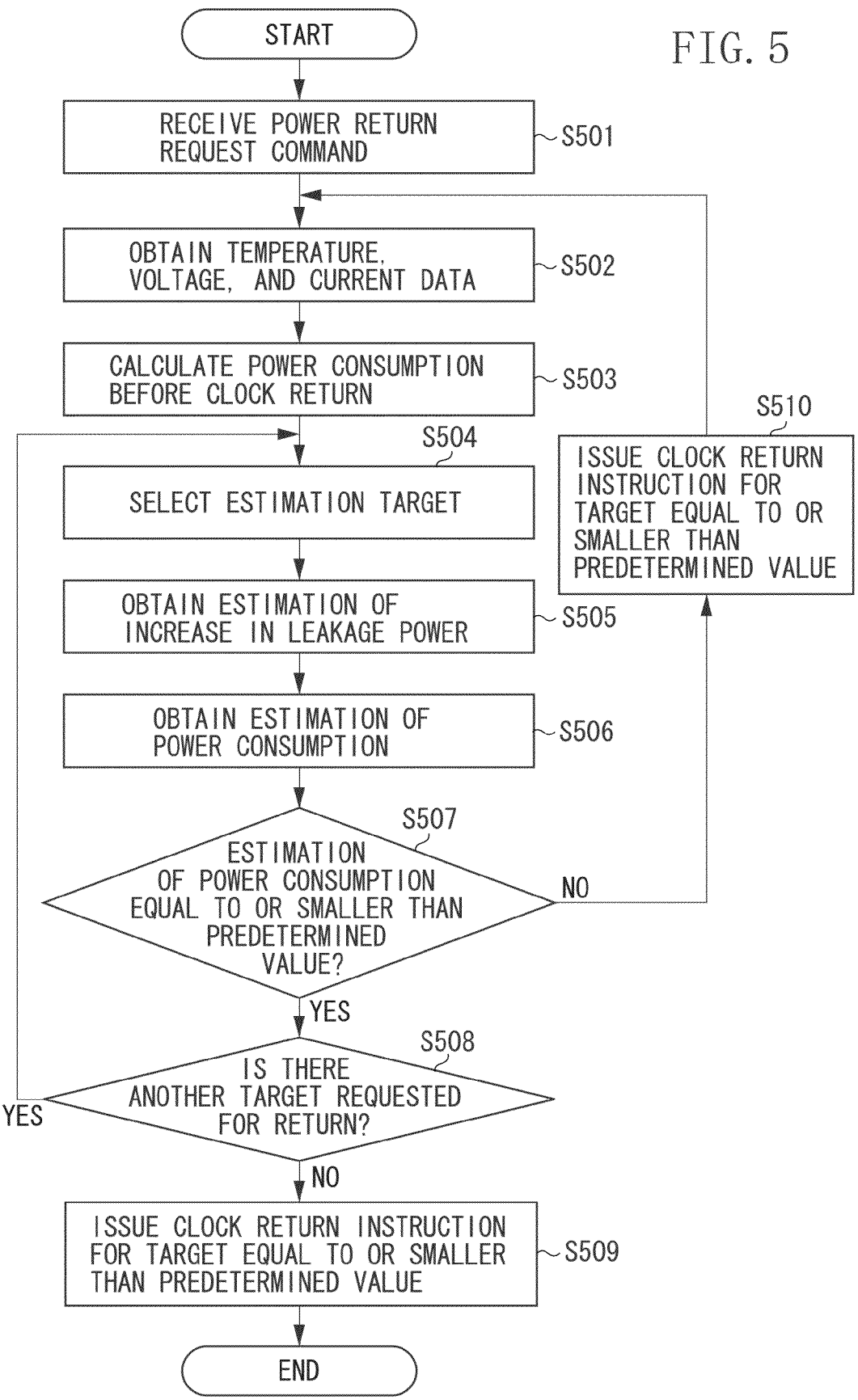
FIG. 5 is a flowchart of processing for selecting a clock return target.

FIG. 5 is a flowchart illustrating processing in which the power control unit 101 selects a clock return target upon reception of a power return request. The description of the present flowchart will use an example in which, in the semiconductor integrated circuit having 19 subsystems (n=19), power is returned for five subsystems (corresponding to n=3, 4, 8, 14, and 19) for which power had been shut down. Further, an example that will be described first corresponds to a line graph indicated by a solid line A in FIG. 7.

First, in step S501, the power control unit 101 receives a power return request that instructs the power control unit 101 to return the subsystems (corresponding to n=3, 4, 8, 14, and 19), from the system control unit 104. In the following description, control for returning subsystems while prioritizing a subsystem first instructed from the system control unit 104 will be described. In the above-described example, the subsystems 3, 4, 8, 14, and 19 are returned in this order. Alternatively, information indicating subsystems to be returned, and priority order(s) of the subsystems to be returned may be included in the power return request. In another alternative, the power control unit 101 may be configured in such a manner that information indicating which subsystem is prioritized to be returned is set in a storage device of the power control unit 101 in advance. For simplification of the description, a case in which a power return request is issued in such a state that power supply is shut down to all of the 19 subsystems will be described. After receiving the power return request, the power control unit 101 commands the power switch control unit 107 to turn on the power switches of the subsystems 3, 4, 8, 14, and 19.

Next, in step S502, the power control unit 101 obtains the present temperature, voltage, and current data of the semiconductor integrated circuit 109 using the power detection unit 102. Further, in step S503, the power control unit 101 calculates an estimation of power consumption of the semiconductor integrated circuit 109 before a clock return from the received voltage and current data.

In step S504, the power control unit 101 selects a subsystem that becomes a target for which an estimation after a clock return is calculated. In the present example, the power control unit 101 prioritizes the subsystem 3 based on the power return request.

Next, in step S505, the power control unit 101 obtains information indicating an estimation of instantaneously increasing dynamic power (refer to FIG. 6) and an estimation of a temperature increase (not illustrated) when the subsystem 3 shifts into the initialization state, and a "temperature-leakage power characteristic table" from the power data storage unit 103. The power control unit 101 may be provided with a storage unit (not illustrated) for temporarily storing the read information and table, and obtain information for each subsystem. In this case, when the processing proceeds to step S505 again, the process for loading the information from the power data storage unit 103 can be skipped.

Figure 12:
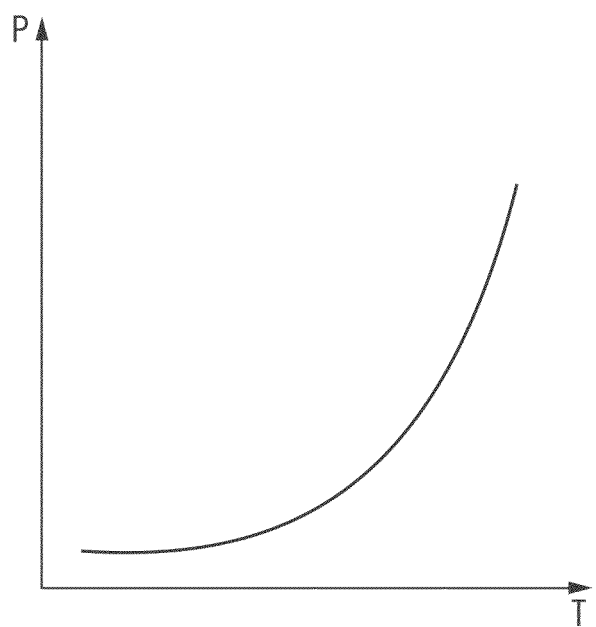
FIG. 12 is a leakage power-temperature curve.

Further, the power control unit 101 estimates a temperature when the clock is returned, for subsystem 3, based on the temperature data obtained from the power detection unit 102 in step S502 and the temperature increase of subsystem 3. Then, the power control unit 101 obtains an estimated value of leakage power (that increases when the clock is supplied to subsystem 3) by referring to the "temperature-leakage power characteristic table". As illustrated in FIG. 12, leakage power exponentially increases as temperature increases.

The various kinds of data held by the power data storage unit 103 may be set by firmware control in advance after cancelation of "Power On Reset" when the semiconductor integrated circuit 109 is powered on. Further, at the time of changing the data held by the power storage unit 103 after the semiconductor integrated circuit 109 is powered on, the data may be rewritten by firmware control as necessary.

Next, in step S506, the power control unit 101 obtains an estimation of power consumption when clock supply to the subsystem 3 is restarted by adding the power consumption obtained in step S503, and the dynamic power and the leakage power obtained in step S505.

Next, in step S507, the power control unit 101 checks whether the estimation of power consumption obtained in step S506 is equal to or smaller than the predetermined power of the semiconductor integrated circuit 109. If the estimation of power consumption obtained in step S506 is not equal to or smaller than the predetermined power of the semiconductor integrated circuit 109 (NO in step S507), clock supply to the subsystem. 3 should not be returned immediately. In the present example, the processing proceeds to step S508, assuming that the estimation of power consumption is equal to or smaller than the predetermined power. The predetermined power is a power value for allowing the semiconductor integrated circuit 109 to stably operate, but may be, for example, a current value (a predetermined current) as long as it is an index for allowing the semiconductor integrated circuit 109 to stably operate and is a value deductible from power. Conditional branching control in step S507 can prevent exceeding a power consumption value of the semiconductor integrated circuit 109 over the predetermined power at the time of a clock return for initialization of the subsystem 3.

In step S508, the power control unit 101 determines whether there is a target for which an estimation should be calculated next among the subsystems (3, 4, 8, 14, and 19) for which power returns have been requested in step S501. In the present example, estimations should be calculated for the subsystems 4, 8, 14, and 19 (YES in step S508). Therefore, the processing proceeds to step S504. At this time, in step S504, the power control unit 101 selects the subsystem 4 as an estimation target, and steps S505 to S507 are also performed in a similar manner as described above. However, in step S506, power consumption is estimated by adding the power consumption obtained in step S503, the increase due to the clock return for the subsystem 3, and an increase due to a clock return for the subsystem 4.

Further processing returns from step S508 to step S504. At this time, the power control unit 101 selects the subsystem 8, for which steps S505 to S507 are performed in a similar manner as described above. When further processing again returns to step S504, the power control unit 101 selects the subsystem 14, for which steps S505 to S506 are performed in a similar manner as described above. At this time, in step S506, power consumption is estimated by adding the power consumption obtained in step S503 and the increases due to the clock returns for the subsystems 3, 4, 8, and 14.

If the estimated power consumption exceeds the predetermined value at this time (NO in step S507), the processing proceeds from step S507 to step S510.

In step S510, for targets with estimations equal to or smaller than the predetermined power (in the present example, the subsystems 3, 4, and 8), the power control unit 101 issues a clock return instruction to the system control unit 104.

Then, the processing proceeds to step S502, in which the power control unit 101 obtains the present temperature, voltage, and current data of the semiconductor integrated circuit 109 again from the power detection unit 102. Thus actual measured values are used after returns of the subsystems 3, 4, and 8 when power consumption is estimated for the remaining subsystems 14 and 19. Even if the processing proceeds to step S502 immediately after step S510, the processing circulates through steps S502 to S507 and step S510 since the instantaneous increase in power consumption does not subside. However, the processing may be delayed in step S510.

If steps S504 to S508 can be processed in a similar manner with the subsystems 14 and 19 set as estimation targets sequentially when the increase in power consumption subsides to some degrees, the power control unit 101 can determine in step S508 that there is no target for which an estimation should be calculated next among the subsystems for which power returns have been requested (NO in step S508).

In step S509, the power control unit 101 issues a clock return instruction for the subsystems 14 and 19 to the system control unit 104. Then, the processing ends.

In a case where the power control unit 101 cannot detect any target with an estimation equal to or smaller than the predetermined power in step S510, the issuance of the clock return instruction is omitted. Further, the processing illustrated in FIG. 5 may be controlled to be ended in a case where at least one of the subsystems 3, 4, 8, 14, and 19 as return targets included in the request instruction cannot be started up (this is determined based on, for example, the number of repetitions of step S510). In this case, along with the end of the processing illustrated in FIG. 5, the power control unit 101 transmits an error notification about the subsystem for which the clock cannot be returned, to the system control unit 104.

Then, after receiving the error notification, the system control unit 104 determines whether the return processing should be repeated for the subsystem notified in the error notification. The system control unit 104 leaves power shut down to any subsystem(s) unnecessary for this repetition.

Figure 7:
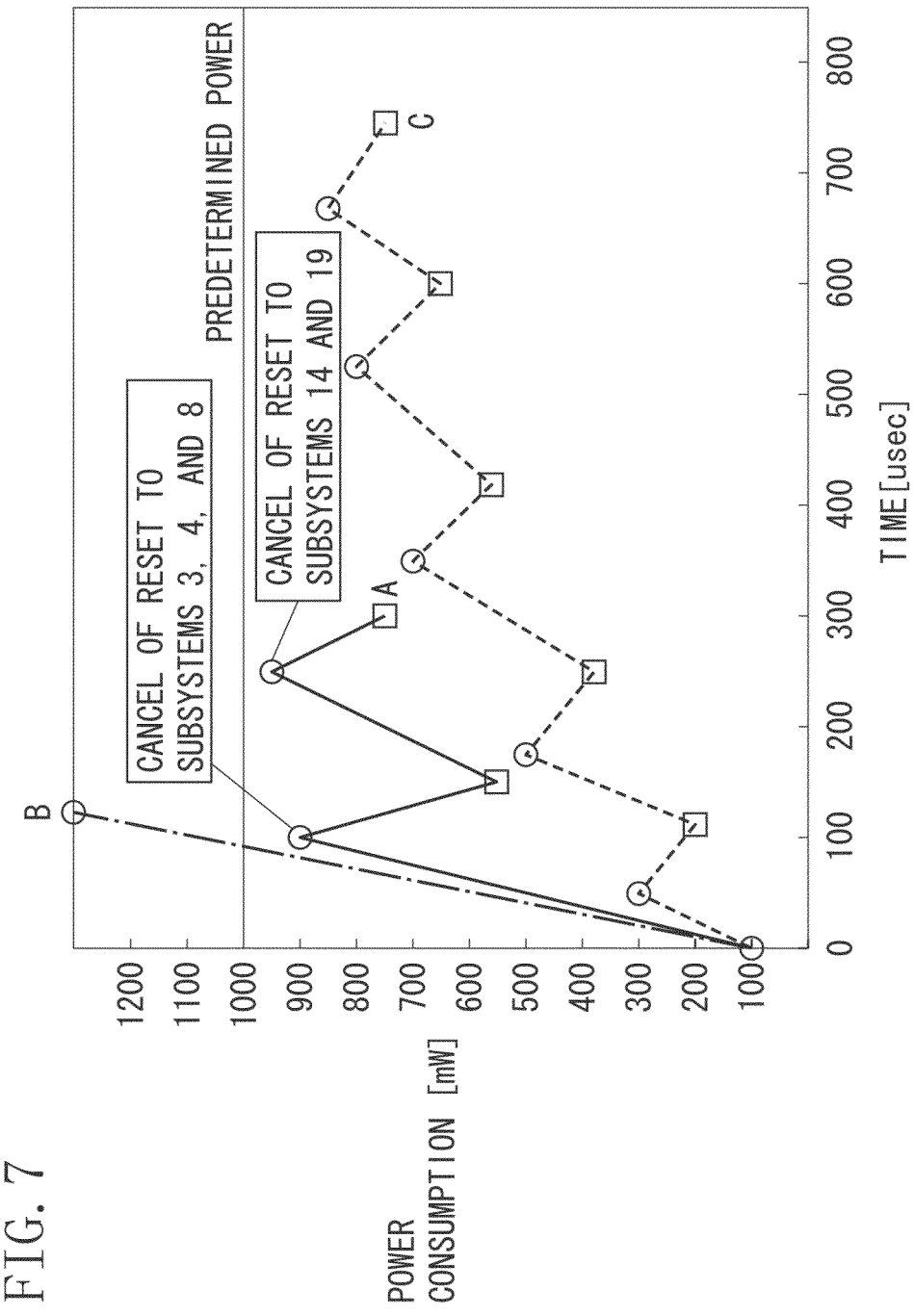
FIG. 7 is a graph of power consumption timelines when clocks are returned for a plurality of subsystems by an exemplary embodiment of the present invention.

FIG. 7 is a graph indicating power consumption over time as the subsystems 3, 4, 8, 14, and 19 are returned. The solid line A corresponds to the example described with reference to the flowchart of FIG. 5. In this graph, assume that the subsystems 3, 4, 8, 14, and 19 have been already charged with electric charges, and the clock return instruction for the first clock return target has been already issued at the time 0 μsec.

Referring to the solid line A, starting from such a state that power is supplied only to the subsystems 3, 4, 8, 14, and 19 (power consumption 100 mW), the power consumption increases to 900 mW as the clocks to the subsystems 3, 4, and 8 are returned (at 100 μsec in FIG. 7). Upon completion of the initialization of the subsystems 3, 4, and 8, the power consumption reduces. Then, clock returns for the subsystems 14 and 19 are instructed.

An alternately long and short dash line B indicates such a state that the clocks are returned to initialize the subsystems 3, 4, 8, 14, and 19 simultaneously, and this line exceeds the predetermined power value (1.0 W). A uniformly dashed line C indicates an example that instructs a clock return for one subsystem at a time. This example can be realized by controlling the flowchart of FIG. 5 so as to do nothing in step S510 and exchanging the orders of steps S508 and S509. The example indicated by the uniformly dashed line C takes almost twice the time compared to the above-described solid line A. Therefore, the initialization time can be reduced by synchronizing clock supply start timing of as many subsystems as possible within a range that does not exceed the predetermined power as indicated by the solid line A.

Figure 11:
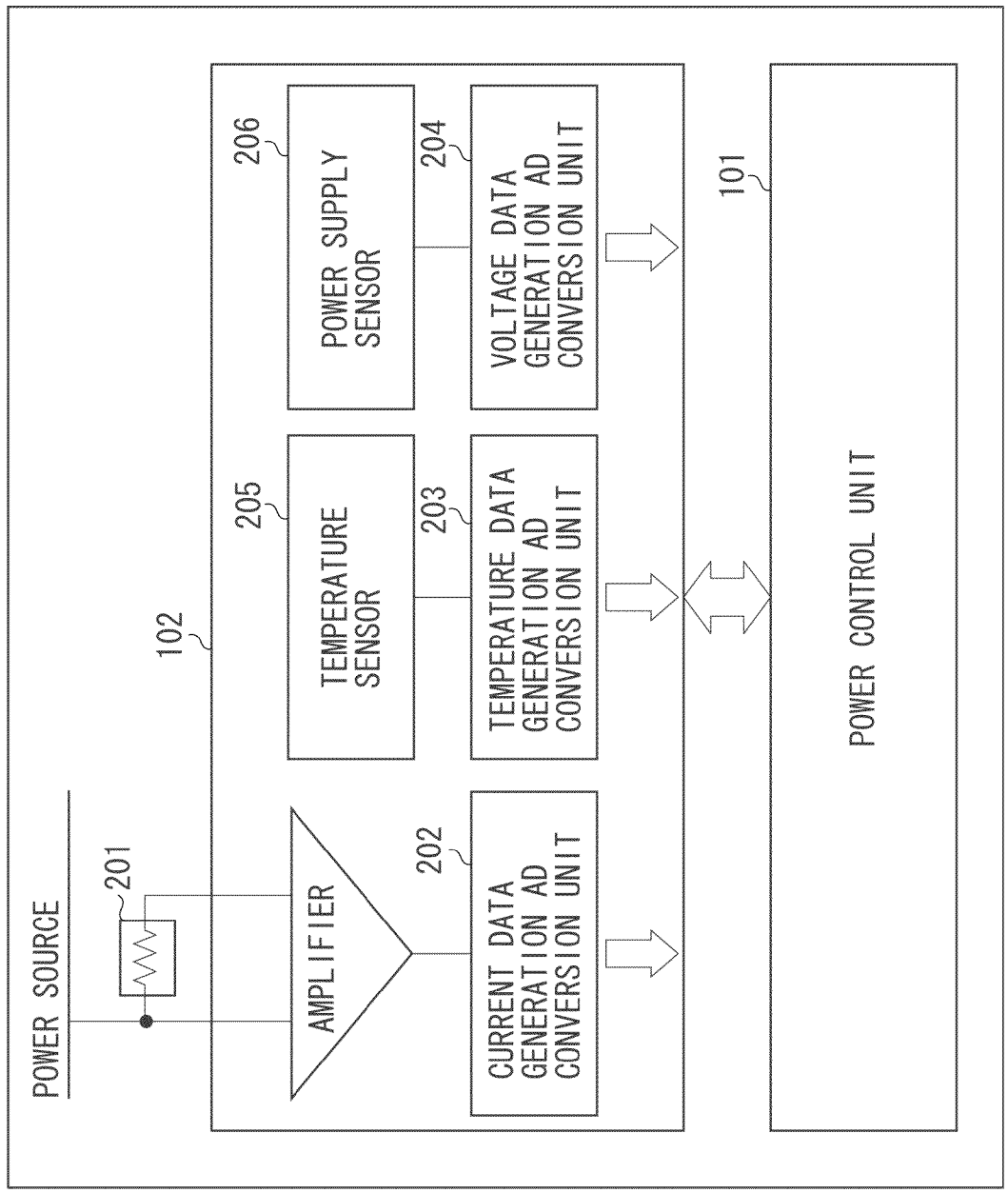
FIG. 11 is a block diagram of a configuration of a power detection unit.

Next, an example of a configuration of the power detection unit 102 will be described. In FIG. 11, a gain of a current detected by a sense resistor 201 is amplified by an amplifier 207, is converted from analog data into digital data by an analog-digital (AD) converter 202, and is then output toward the power control unit 101. In a case where a current detected by the sense resistor 201 is sufficiently large, the amplifier 207 may be omitted. A temperature sensor 205 detects a temperature of the semiconductor integrated circuit 109. The detected temperature is also converted from analog data into digital data by an AD converter 203, and is output to the power control unit 101 in a similar manner. A power supply sensor 206 detects various kinds of power voltages in the semiconductor integrated circuit 109. The detected power voltage is converted from analog data into digital data by an AD converter 204, and is output to the power control unit 101. The data is output to the power control unit 101 in response to a request from the power control unit 101 (S502 in FIG. 5).

In this way, according to the present exemplary embodiment, it is possible to prevent concentration of power consumption during initialization for a plurality of subsystems for which power supply is restarted to efficiently perform initialization.

Next, a third exemplary embodiment of the present invention will be described. In the first and the second exemplary embodiments, the system control unit 104 controls the clock control unit 105 and the reset control unit 106 according to, for example, a clock return instruction from the power control unit 101. In the third exemplary embodiment, the power control unit 101 controls the clock control unit 105 and the reset control unit 106. Therefore, in the third exemplary embodiment, the power control unit 101 illustrated in FIG. 3 is directly connected to the reset control unit 106 and the clock control unit 105.

Figure 9:
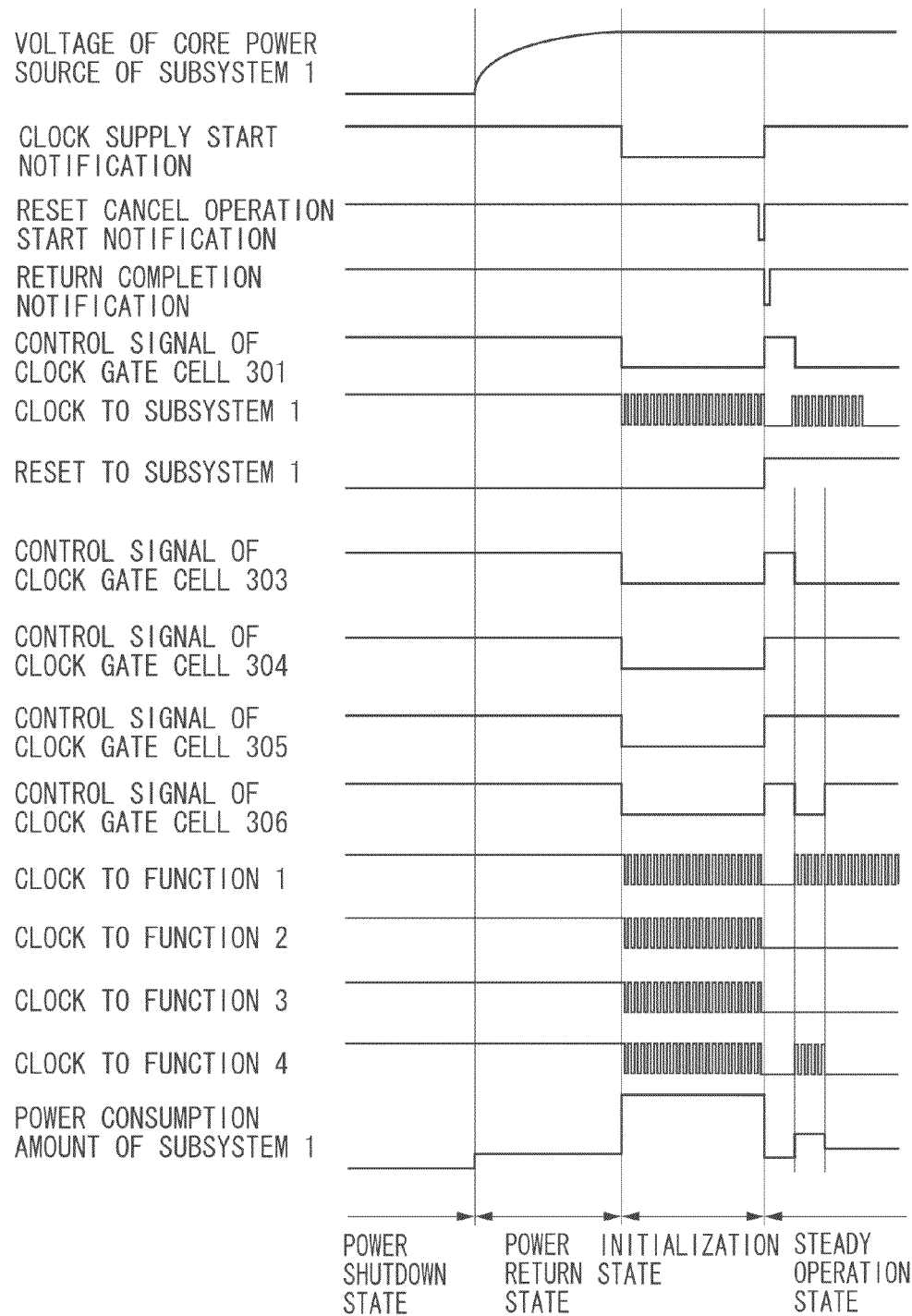
FIG. 9 is a timing chart when power is returned for subsystem 1 at the time of implementation of clock control by a power control unit to the subsystem.

FIG. 9 is a timing chart when the subsystem 1 is returned according to the third exemplary embodiment. Differences from the timing chart illustrated in FIG. 4 are as follows. In the initialization state, the power control unit 101 directly instructs the clock control unit 105 to supply the clock. Further, at the last stage during the initialization state, the power control unit 101 directly instructs the reset control unit 106 to cancel the reset signal. According to the third exemplary embodiment, the clock return instruction illustrated in FIG. 4 is unnecessary, but instead, the power control unit 101 should notify the system control unit 104 that the return has been completed.

According to the present exemplary embodiment, the power control unit 101 can take over the load of reset control and clock control from the system control unit 104.

A fourth exemplary embodiment will be described. A hardware configuration of the fourth exemplary embodiment may be similar to the first to third exemplary embodiments. The fourth exemplary embodiment holds power consumption for each operation mode (for each power mode) as illustrated in FIG. 10 as mode information in the power data storage unit 103 or a storage unit 1401, in addition to the estimation of the increase in power consumption (refer to FIG. 6) and the temperature increase (not illustrated) for each subsystem. The power consumption illustrated in FIG. 10 is a sum value of an initial value of power consumption before power is supplied to each subsystem to perform initialization, instantaneous dynamic power when the clocks are returned for subsystems turned on in each mode, and leakage power in consideration of a temperature increase, and this power consumption data is set in advance.

Then, when the system control unit 104 issues an instruction to the power control unit 101 indicating which power mode the semiconductor integrated circuit 109 should shift to, the power control unit 101 reads out the table illustrated in FIG. 10 and compares a power consumption profiling value corresponding to the power mode instructed from the system control unit 104 with the predetermined power (assume that the predetermined power is 1.0 W). According to the table illustrated in FIG. 10, in power modes 1, 2, 3, 5, and 7, power consumption is less than 1.0 W, so it is unnecessary to perform the processing for considering an increase in power consumption of each subsystem one by one as illustrated in FIG. 5, and it is also unnecessary to desynchronize clock return timing of a plurality of clock return targets. Therefore, in a case where the instructed power mode is any of the power modes 1, 2, 3, 5, and 7, the power control unit 101 skips the processing illustrated in FIG. 5, and collectively issues a clock return instruction for subsystems that should be turned on in the power mode to which the semiconductor integrated circuit 109 shifts according to the table illustrated in FIG. 10.

On the other hand, when the power mode instructed by the system control unit 104 as a power mode to which the semiconductor integrated circuit 109 should shift is any of power modes 4, 6, 8, 9, and 10 in which power consumption may exceed 1.0 W according to the table illustrated in FIG. 10, the power control unit 101 performs the flow illustrated in FIG. 5 to process initialization in a manner similar to the first to the third exemplary embodiments.

In this way, according to the present exemplary embodiment, it is possible to select whether to skip the processing according to the first to the third exemplary embodiments by referring to the total amount of estimated instantaneous power consumption in each power mode to efficiently perform the clock return operation.

In the above-described exemplary embodiments, the power detection unit 102 and the power data storage unit 103 are disposed within the semiconductor integrated circuit 109. However, these units may be disposed outside the semiconductor integrated circuit 109 as long as they are configured as a single system (or an information processing apparatus).

Figure 8:
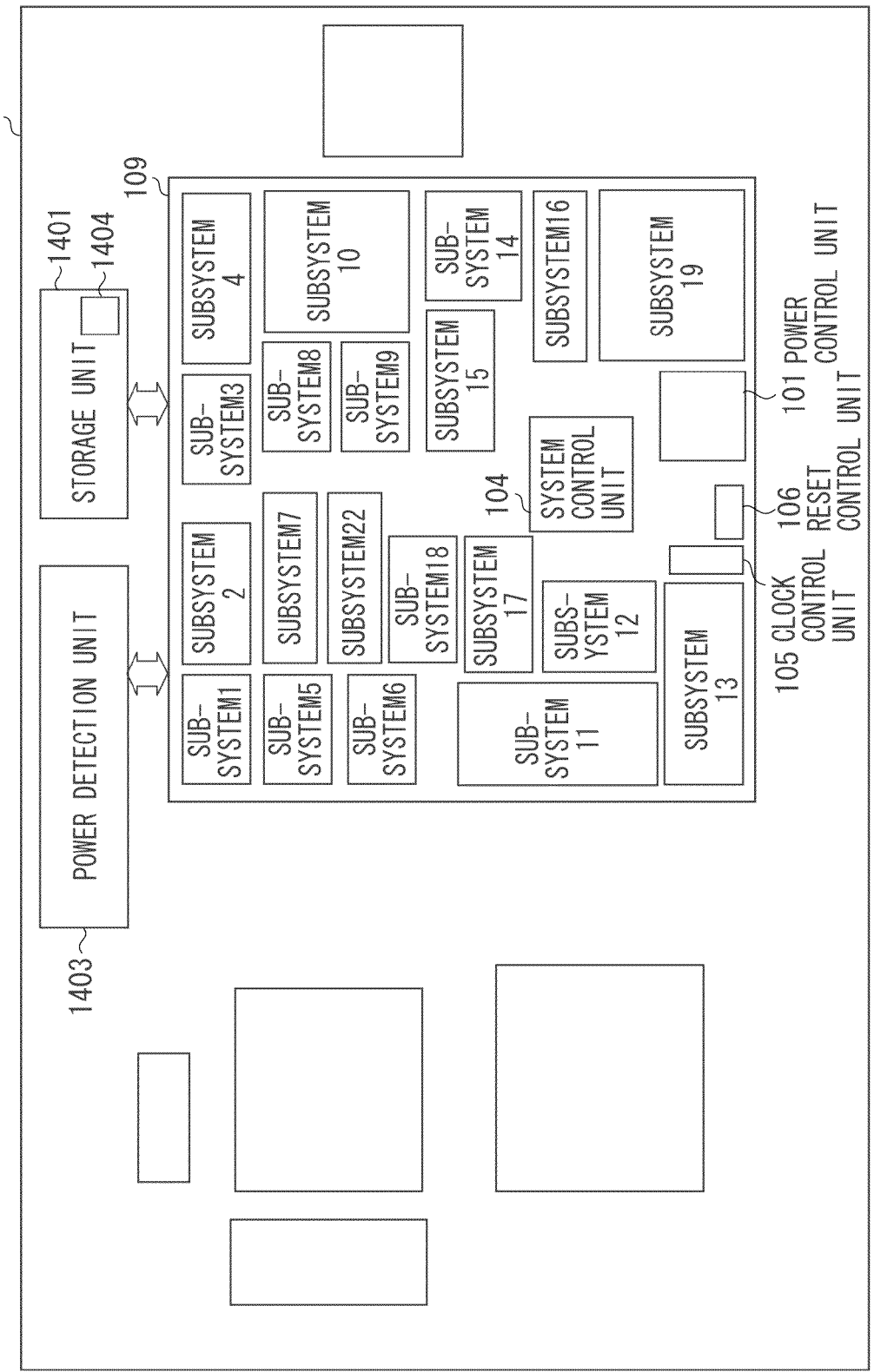
FIG. 8 is a block diagram of a physical configuration of a semiconductor integrated circuit.

FIG. 8 illustrates an outline of such a configuration. In an example illustrated in FIG. 8, a power saving system 1402 is a printed circuit board where the semiconductor integrated circuit 109 is mounted. The storage unit 1401 holds estimation data 1404 that includes an estimated value of dynamic power of each subsystem in a power control target unit 108 when the clock is returned, an estimated value of a temperature increase at this time, and a temperature-leakage power characteristic table of the semiconductor integrated circuit 109. A boot program for use in startup of the semiconductor integrated circuit 109 is also stored in the storage unit 1401.

Employment of the configuration according to the present exemplary embodiment can eliminate the need of providing the power detection unit 102 and the power data storage unit 103 to the semiconductor integrated circuit 109, so that it is possible to reduce the chip size of the semiconductor integrated circuit 109, and reduce the cost of the semiconductor integrated circuit 109.

Further, with regard to startup of an information processing apparatus including the semiconductor integrated circuit 109 according to the above-described respective exemplary embodiments, the semiconductor integrated circuit 109 is configured, for example, when the information processing apparatus is started up by turning on a power source switch, to issue a reset to all subsystems before a start of initialization (this is automatically issued if the semiconductor integrated circuit 109 is a negative logic circuit). However, a reset may be is sued any time before a clock return instruction is issued. Even if the semiconductor integrated circuit 109 is a positive logic circuit, the semiconductor integrated circuit 109 can be configured to automatically issue a reset by reversing the logic at the subsystem side.

Further, in the above-described exemplary embodiments, the power control unit 101 (a second power control unit) controls power, the clock control unit 105, and the reset control unit 106 (a second initialization control unit) for each subsystem, and collectively manages power control for functional modules included in one subsystem. However, the power control unit (a first power control unit), the clock control unit (a first initialization control unit), and the reset control unit (the first initialization control unit) may be provided for each subsystem. In this case, it becomes possible to control power hierarchically structurally, and to control whether to supply power for each functional module more finely. In a case where power is controlled hierarchically structurally, the power control unit in a subsystem may obtain the estimation data 1404 from the power data storage unit 103 and the power detection unit 102, or simplified data may be held in the power control unit in the subsystem in advance. As the number of power domains increase, it becomes more difficult to collectively manage power control. Hierarchically structural control enables desynchronization of clock supply start timing for a plurality of functional modules for initialization with a simple structure even if the number of the plurality of functional modules (a first functional module, a second functional module, and so on) increases.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the above-described respective exemplary embodiments, wiring delays of various kinds of signals and operational delays of respective logical gates are ignored.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-076774 filed Mar. 29, 2012, which is hereby incorporated by reference herein in its entirety.

What is claimed is:

1. A semiconductor integrated circuit comprising:
a plurality of processing blocks each including a plurality of functional modules;
a power control unit configured to start power supply to the processing blocks so as to charge the processing blocks with electric charges; and
an initialization control unit configured to individually control initialization of each of the processing blocks by individually controlling a start of clock supply to each of the processing blocks after the processing blocks are charged with the electric charges, wherein the initialization of each of the processing blocks is initialization of a storage element included in each of the functional modules,
wherein the initialization control unit operates in such a manner that a start of the clock supply to a second processing block is delayed from a start of the clock supply to a first processing block.

2. The semiconductor integrated circuit according to claim 1, wherein the initialization control unit includes a reset signal control unit configured to supply a reset signal to each of the processing blocks, and a clock control unit configured to individually supply a clock to each of the processing blocks.

3. The semiconductor integrated circuit according to claim 2, wherein upon reception of an instruction to start the initialization from the power control unit, the clock control unit supplies the clock until the reset signal is canceled.

4. The semiconductor integrated circuit according to claim 2, wherein upon reception of an instruction to start the clock supply to start the initialization from the power control unit, the clock control unit supplies the clock to a processing block that is a clock supply target only for a predetermined time period.

5. The semiconductor integrated circuit according to claim 2, wherein the initialization control unit sets an initial value of the storage element included in the functional module by causing the clock control unit to start the clock supply in a state such that the reset signal is activated by the reset signal control unit.

6. The semiconductor integrated circuit according to claim 2, wherein the clock control unit includes a clock gate cell that individually corresponds to, at least, each of the processing blocks.

7. The semiconductor integrated circuit according to claim 1,
wherein the power control unit includes a switch control unit configured to control a switch that corresponds to at least one of the processing blocks, and
wherein the power control unit switches whether to supply power to the processing block that corresponds to the switch by switching the switch using the switch control unit.

8. The semiconductor integrated circuit according to claim 1, further comprising:
a storage unit configured to hold an increase in power consumption when the clock is supplied to start the initialization off each of the processing blocks, and reference power consumption; and
a reception unit configured to receive a power return request to perform an instruction to return power for the processing blocks to which power has been shut down,
wherein the power control unit starts the power supply to the processing blocks responsive to the power return request, and
wherein the power control unit obtains the increase in power consumption when the clock is supplied to the processing block, and the reference power consumption from the storage unit, and
determines timing of starting the clock supply to the processing blocks by comparing the increase in power consumption when the clock is supplied to the processing blocks with the reference power consumption.

9. The semiconductor integrated circuit according to claim 8, further comprising a detection unit configured to detect power consumption before a start of the initialization,
wherein the power control unit adds the increase in power consumption held by the storage unit to the power consumption detected by the detection unit before the start of the initialization, to compare the added power consumption to the reference power consumption.

10. The semiconductor integrated circuit according to claim 8, wherein the power control unit performs control so as to simultaneously start the clock supply to the processing blocks within a range that does not exceed the reference power consumption.

11. The semiconductor integrated circuit according to claim 8,
wherein the storage unit further stores mode information including information indicating which processing block among the plurality of processing blocks is to be supplied with power for each operation mode, and an estimation of power consumption in the operation mode,
wherein the reception unit issues to the power control unit an instruction indicating in which operation mode the semiconductor integrated circuit is to be operated, and
wherein the power control unit determines, based on the instruction and the mode information, timing of starting the clock supply to the processing blocks by comparing the increase in power consumption of the processing blocks with the reference power consumption.

12. The semiconductor integrated circuit according to claim 1,
wherein at least one of the processing blocks is configured to be controlled by a same power control element as to whether power is supplied, and
wherein the processing block includes at least one of a circuit block, a functional module, and an integrated circuit.

13. The semiconductor integrated circuit according to claim 1, further comprising an instruction unit configured to instruct the power control unit to start the power supply to the processing blocks and then to instruct the initialization control unit to start the clock supply to the first processing block and the second processing block.

14. The semiconductor integrated circuit according to claim 1, further comprising:
a detection unit configured to detect power consumption before a start of the initialization of the processing blocks;
a storage unit configured to hold an increase in power consumption when a clock is supplied to start the initialization of each of the processing blocks, and reference power consumption; and
an instruction unit configured to instruct the power control unit to start the power supply to the processing blocks and then to instruct the initialization control unit to start the clock supply to the power control units,
wherein the instruction unit determines timing of starting the clock supply to the processing blocks by comparing a sum of the increase in power consumption when the clock is supplied to the processing blocks and the power consumption before the start of the initialization of the processing blocks with the reference power consumption.

15. An information processing apparatus including a semiconductor integrated circuit, the semiconductor integrated circuit comprising:
a plurality of processing blocks each including a plurality of functional modules;
a power control unit configured to start power supply to the processing blocks which are in a state that the power supply to the processing blocks is stopped, such that the power control unit charges the processing blocks with electric charges; and
an initialization control unit configured to individually control initialization of each of the processing blocks by controlling clock supply to the processing blocks after the processing blocks are charged with the electric charges,
wherein the initialization control unit controls in such a manner that a start of the clock supply for the initialization of the first processing block is different from a start of the clock supply for the initialization of the second processing block.

16. A semiconductor integrated circuit comprising:
a plurality of processing blocks each including a plurality of functional modules, a first power control unit configured to control power supply to the functional modules, and a first initialization control unit configured to individually control initialization off each of the functional modules;
a second power control unit configured to control power supply to the processing blocks; and
a second initialization control unit configured to individually control initialization off each of the processing blocks, wherein, after the first power control unit starts the power supply to a first functional module and a second functional module, timings of starting clock supply to start the initialization off the first functional module and the second functional module are differentiated by one of the first initialization control unit or the second initialization control unit.

17. A method for controlling a semiconductor integrated circuit including a plurality of processing blocks each including a plurality of functional modules, a power control unit configured to start power supply to the processing blocks so as to charge the processing blocks with electric charges, and an initialization control unit configured to individually control initialization off each of the processing blocks by individually controlling a start of clock supply to each of the processing blocks after the processing blocks are charged with the electric charges, wherein the initialization of each of the processing blocks is initialization of a storage element included in each of the functional modules, the method comprising:

causing the initialization control unit to operate in such a manner that a start of the clock supply to a second power processing block is delayed from a start of the clock supply to a first processing block.

18. A method for controlling a semiconductor integrated circuit including a plurality of processing blocks each including a plurality of functional modules, a first power control unit configured to control power supply to the functional modules, and a first initialization control unit configured to individually control initialization off each of the functional modules, a second power control unit configured to control power supply to the processing blocks, and a second initialization control unit configured to individually control initialization off each of the processing blocks, the method comprising:

differentiating, after the first power control unit starts the power supply to a first functional module and a second functional module, timings of starting clock supply to start the initialization off the first functional module and the second functional module by one of the first initialization control unit or the second initialization control unit.

19. A semiconductor integrated circuit comprising:
a plurality of processing blocks each including a plurality of functional modules;
a power control unit configured to control power supply to the plurality of processing blocks; and
an initialization control unit configured to individually control initialization of each of the processing blocks by individually controlling a start of clock supply to each of the processing blocks after the power control unit starts power supply to the plurality of processing blocks, wherein the initialization of each of the processing blocks is initialization of a storage element included in each of the functional modules,
wherein the initialization control unit operates in such a manner that a start of the clock supply to a second processing block included in the plurality of processing blocks for the initialization is delayed from a start of the clock supply to a first processing block included in the plurality of processing blocks for the initialization.

20. A method for controlling a semiconductor integrated circuit including a plurality of processing blocks each including a plurality of functional modules, the method comprising:
controlling, at a power control unit, power supply to the plurality of processing blocks;
individually controlling initialization of each of the processing blocks by individually controlling a start of clock supply to each of the processing blocks after the power control unit starts power supply to the plurality of processing blocks, wherein the initialization of each of the processing blocks is initialization of a storage element included in each of the functional modules; and
delaying start of the clock supply to a second processing block included in the plurality of processing blocks for the initialization, from a start of the clock supply to a first processing block included in the plurality of processing blocks for the initialization.

21. A semiconductor integrated circuit comprising:
a plurality of processing blocks each including a plurality of functional modules, a first power control unit configured to control power supply to the plurality of functional modules, and a first initialization control unit configured to individually control initialization of each of the plurality of functional modules;
a second power control unit configured to control power supply to the plurality of processing blocks; and
a second initialization control unit configured to individually control initialization of each of the plurality of processing modules,
wherein timing of when the first initialization control unit and the second initialization control unit start clock supply to first and second functional modules to start the initialization after the first power control unit starts power supply to the first and second functional modules, differs.

22. A method for controlling a semiconductor integrated circuit including a plurality of processing blocks, the method comprising:
controlling, at a first power control unit, power supply to the plurality of processing blocks;
individually controlling initialization, at a first initialization control unit, of each of the plurality of processing modules, wherein each of the plurality of processing blocks includes a plurality of functional modules, a second power control unit configured to control power supply to the plurality of functional modules, and a second initialization control unit configured to individually control initialization of each of the plurality of functional modules; and
causing timing of when the first initialization control unit and the second initialization control unit start clock supply to first and second functional modules to start the initialization after the second power control unit starts power supply to the first and second functional modules, to differ.

* * * * *